(12) United States Patent
Inagaki et al.

(10) Patent No.: US 9,148,255 B2
(45) Date of Patent: Sep. 29, 2015

(54) DETECTION SIGNAL OUTPUT DEVICE

(71) Applicant: KABUSHIKI KAISHA TOKAI RIKA DENKI SEISAKUSHO, Aichi (JP)

(72) Inventors: Osamu Inagaki, Aichi (JP); Shinichi Yoshida, Aichi (JP); Eijiro Hirose, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 222 days.

(21) Appl. No.: 13/727,003

(22) Filed: Dec. 26, 2012

(65) Prior Publication Data

US 2013/0178074 A1 Jul. 11, 2013

(30) Foreign Application Priority Data

Jan. 5, 2012 (JP) ................. 2012-000729

(51) Int. Cl.
*H04L 1/06* (2006.01)
*B60Q 1/00* (2006.01)
*H01H 9/16* (2006.01)

(52) U.S. Cl.
CPC ............... *H04L 1/06* (2013.01); *B60Q 1/0082* (2013.01); *H01H 9/167* (2013.01)

(58) Field of Classification Search
CPC ........................................................ H04L 1/06
USPC ............................. 361/760; 200/252; 439/55
See application file for complete search history.

(56) References Cited

U.S. PATENT DOCUMENTS

| 6,700,084 | B2 | 3/2004 | Shibata et al. | |
|---|---|---|---|---|
| 7,440,286 | B2 * | 10/2008 | Hiew et al. | 361/737 |
| 2003/0222282 | A1 * | 12/2003 | Fjelstad et al. | 257/200 |
| 2009/0002956 | A1 * | 1/2009 | Suwa et al. | 361/728 |
| 2009/0198399 | A1 * | 8/2009 | Kubo et al. | 701/22 |
| 2011/0128712 | A1 * | 6/2011 | Prest et al. | 361/783 |

FOREIGN PATENT DOCUMENTS

JP 2001-236848 8/2001

* cited by examiner

*Primary Examiner* — Jenny L Wagner
*Assistant Examiner* — Michael P McFadden
(74) *Attorney, Agent, or Firm* — Greenblum & Bernstein, P.L.C.

(57) ABSTRACT

A detection signal output device includes connector terminals adapted to be connected by a cable to an external device. Fixed contacts are spaced apart from the connector terminals and output information indicating detector states. An integrated circuit includes a box-shaped package having different first and second side surfaces. First IC terminals are arranged on the first side surface and electrically connected to the fixed contacts. Second IC terminals are arranged on the second side surface and electrically connected to the connector terminals. The integrated circuit generates an information signal, in accordance with information indicating the detector states obtained through the first IC terminals, and outputs the information signal from one of the second IC terminals. The fixed contacts are arranged in correspondence with the first side surface, and the connector terminals are arranged in correspondence with the second side surface.

4 Claims, 2 Drawing Sheets

DETECTION SIGNAL OUTPUT DEVICE

CROSS-REFERENCE TO RELATED APPLICATIONS

This application is based upon and claims the benefit of priority from prior Japanese Patent Application No. 2012-000729, filed on Jan. 5, 2012, the entire contents of which are incorporated herein by reference.

FIELD

The present invention relates to a detection signal output device.

BACKGROUND

Japanese Laid-Open Patent Publication No. 2001-236848 describes a switch device including a plurality of switches like a combination switch for a vehicle. The switch device is connected by a cable to a controller. An information signal related to the activation and deactivation of a switch is sent through the cable to the controller.

There are two types of such a switch device, a non-multiplex type and a multiplex type. A non-multiplex type switch device includes connector terminals, the number of which is greater than or equal to the number of the switched. Voltage is applied to each connector terminal in accordance with the activation state or deactivation state of the corresponding switch. A signal line is provided for each switch. Thus, the number of signal lines arranged in the cable is the same as the number of switches.

FIG. 4A shows a multiplex type switch device. The switch device includes an integrated circuit (IC) 100. The IC includes IC terminals 101 connected by connecting members 103 to contacts 105$a$ to 105$h$ or connector terminals 102$a$ to 102$c$. The connector terminal 102$a$ is a communication connector terminal, and the two connector terminals 102$b$ and 102$c$ are power connector terminals.

Voltages corresponding to an activation or deactivation state of switches are applied to the contacts 105$a$ to 105$h$, and consequently, to the connecting members 103 and the IC terminals 101 that are connected to the contacts 105$a$ to 105$h$. Operational power is supplied by the power connector terminals 102$b$ and 102$c$ to the IC 100. Based on the voltages applied to the contacts 105$a$ to 105$h$, the IC 100 outputs an information signal related to the activation and deactivation state of the switches to the communication connector terminal 102$a$. The information signal is then sent through a cable from the communication connector terminal 102$a$ to a controller (not shown). In this manner, in a multiplex type switch device, the number of connector terminals and the number of signal lines in the cable can be reduced.

However, in the structure of FIG. 4A, the connecting members 103 are required to be laid out without contacting one another from the IC terminals 101 to the contacts 105$a$ to 105$h$. This results in the switch device having a complicated internal structure.

Further, as shown in the enlarged view of FIG. 4B, in the IC 100, for example, an IC terminal 101$a$, which is supplied with power and connected to the power connector terminal 102$b$ or 102$c$, may be arranged adjacent to an IC terminal 101$b$, which receives voltage that is in accordance with the activation or deactivation state of a switch and connected to one of the contacts 105$a$ to 105$f$. The voltage applied to the IC terminals 101$a$ is higher than that applied to the IC terminal 101$b$. Thus, the magnetic field formed by the IC terminal 101$a$ may influence and change the voltage level of the adjacent IC terminal 101$b$. Accordingly, to reduce the influence of the magnetic field formed by the IC terminal 101$a$, a protection element such as a capacitor must be provided for the IC terminal. The IC terminal 101$b$ may be influenced by such a magnetic field not only when the IC terminals 101$a$ and 101$b$ are arranged adjacent to each other but also when the distance between the IC terminals 101$a$ and 101$b$ is short.

SUMMARY

One aspect of the present invention is a detection signal output device including a plurality of connector terminals adapted to be connected by a cable to an external device. A plurality of fixed contacts spaced apart from the connector terminals. The fixed contacts output information indicating states of a plurality of detectors. An integrated circuit includes a box-shaped package. The package includes a first side surface and a second side surface that differs from the first side surface. A plurality of first IC terminals are electrically connected to the fixed contacts and arranged on the first side surface of the package. A plurality of second IC terminals are electrically connected to the connector terminals and arranged on the second side surface of the package. The integrated circuit generates an information signal in accordance with information indicating states of the detectors obtained through the first IC terminals. The integrated circuit outputs the information signal from one of the second IC terminals. The first side surface of the package is arranged in correspondence with the fixed contacts on the first side surface of the package. The second side surface of the package is arranged in correspondence with the connector terminals.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a switch device that functions as a detection signal output device will now be described with reference to FIGS. 1 to 3. A combination switch, which is operated by a stick-like lever, is coupled to a steering column of a vehicle. The switch device of the present embodiment is arranged, for example, in the steering column at a basal portion of the lever.

Figure 1:
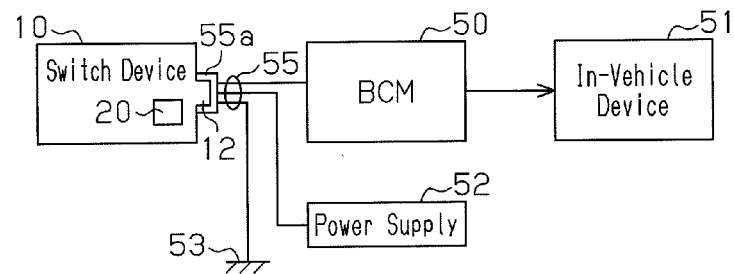
FIG. 1 is a schematic block diagram showing a switch device and a BCM connected to the switch device.

As shown in FIG. 1, a switch device 10 is connected by a cable 55 to a body control module (BCM) 50, which serves as an external device, a power supply 52, and ground 53. The switch device 10 receives operational power through the cable 55 from the power supply 52 and ground 53. Further, the switch device 10 provides the BCM 50 with an information signal corresponding to the operation of the lever through the cable 55. The switch device of the present embodiment is of a multiplex type such as that described in the Background Section. Based on the information signal from the switch device 10, the BCM 50 operates in-vehicle devices 51 such as the windshield wiper, turn signal, and lights.

The switch device 10 will now be described in detail.

Figure 2A:
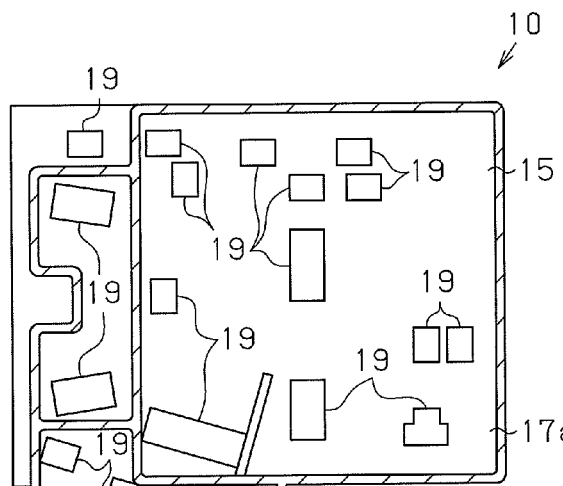
FIG. 2A is a schematic cross-sectional view of the switch device shown in FIG. 1.
Figure 2B:
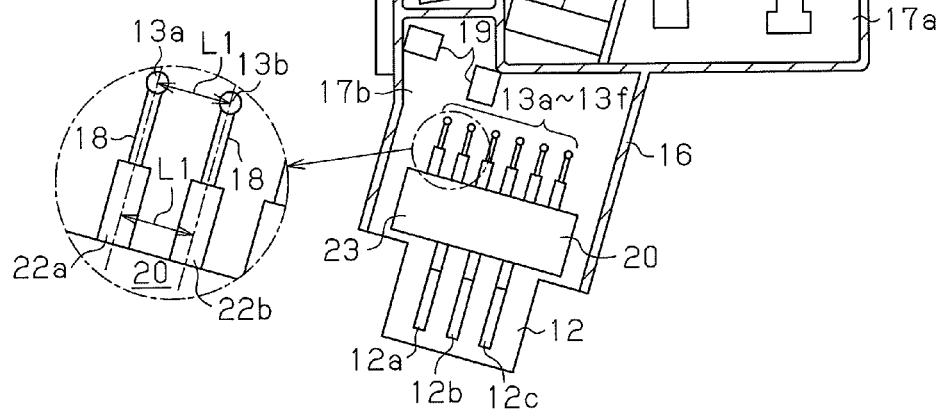
FIG. 2B is an enlarged viewed showing fixed contacts of the switch device of FIG. 2A.

As shown in FIG. 2A, the switch device 10 includes a square base 15 and an extension 16, which is coupled to the left side of a lower surface of the base 15. The extension 16 extends diagonally toward the left lower side of FIG. 2A. Further, a substrate 17a is arranged in the base 15 on a bottom surface, and a substrate 17b is arranged in the extension 16 on a bottom surface.

A connector unit 12 is formed in a lower part of the extension 16. A connector 55a of the cable shown in FIG. 1 is connected to the connector unit 12. As shown in FIG. 2A, the connector unit 12 includes three connector terminals 12a, 12b, and 12c. The connector terminal 12a is a communication connector terminal, and the connector terminals 12b and 12c are power connector terminals. The cable 55 includes a signal line, which connects the switch device 10 to the BCM 50, and two power lines, which connect the switch device 10 to the power supply 52 and ground 53.

Figure 3:
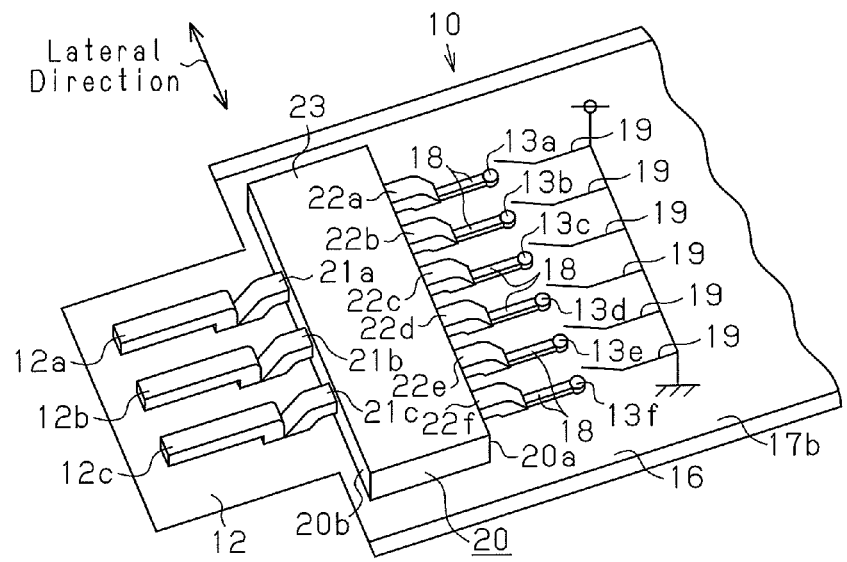
FIG. 3 is an enlarged perspective view showing the interior of a connector unit in the switch device of FIG. 1.

As shown in FIG. 3, the connector terminals 12a to 12c, which are formed from a conductive material, are L-shaped. The connector terminals 12a to 12c are arranged at equal intervals along the lateral direction of the connector unit 12. The connector terminals 12a to 12c each have one end (lower end as viewed in FIG. 3) fixed by, for example, solder to the substrate 17b and another end extending out of the switch device 10.

Further, as shown in FIG. 3, a plurality of (six in this example) of fixed contacts 13a, 13b, 13c, 13d, 13e, and 13f are arranged on the substrate 17b in the extension 16. The fixed contacts 13a to 13f are laid out in a direction parallel to the direction in which the connector terminals 12a to 12c are laid out. As shown in the enlarged view of FIG. 2B, two adjacent ones of the fixed contacts 13a to 13f are spaced apart from each other by a fixed distance L1. The fixed distance L1 is set to a distance that keeps the fixed contacts 13a to 13f electrically unconnected.

As shown in FIG. 3, the fixed contacts 13a to 13f each include a switch 19, which functions as a detector switched between an activated state and a deactivated state in accordance with the operation of the lever. A predetermined voltage is applied to each switch 19. As shown in FIG. 2A, the switches 19 are actually arranged on the substrate 17a in the base 15.

As shown in FIG. 3, an IC 20 is arranged in the extension 16 on the substrate 17b between the fixed contacts 13a to 13f and the connector terminals 12a to 12c. The IC 20 is formed in a resin package 23 that is, for example, box-shaped. The package 23 includes opposite first and second long side surfaces 20a and 20b. A plurality of (six in the present example) of switch side IC terminals 22a, 22b, 22c, 22d, 22e, and 22f are arranged along the longitudinal direction on the first long side surface 20a. Three vehicle side IC terminals 21a, 21b, and 21c are arranged along the longitudinal direction on the second long side surface 20b. As shown in the enlarged view of FIG. 2B, two adjacent ones of the IC terminals 22a to 22f are spaced apart from each other by the fixed distance L1 in the same manner as the fixed contacts 13a to 13f. The switch side IC terminals 22a to 22f correspond to a plurality of first IC terminals, and the vehicle side IC terminals 21a to 21c correspond to a plurality of second IC terminals. The first long side surface 20a is one example of a first side surface, and the second long side surface 20b is one example of a second side surface.

Each of the IC terminals 21a to 21c and 22a to 22f is generally L-shaped and includes a distal portion that is, for example, soldered and fixed to the substrate 17b. This fixes the IC 20 of the package 23 in a state in which the IC terminals 21a to 21c are spaced apart from the IC terminals 22a to 22f.

The second long side surface 20b of the IC 20 is arranged in correspondence with the connector terminals 12a to 12c, and the first long side surface 20a is arranged in correspondence with the fixed contacts 13a to 13f. The vehicle side IC terminals 21a to 21c include ends respectively contacting ends of the connector terminals 12a to 12c on the substrate 17b.

The switch side IC terminals 22a to 22f are arranged in correspondence with the fixed contacts 13a to 13f, respectively. Metal connecting members 18 are arranged between the switch side IC terminals 22a to 22f and the fixed contacts 13a to 13f. This electrically connects the fixed contacts 13a to 13f to the switch side IC terminals 22a to 22f. Thus, when the switches 19 are activated, predetermined voltages are applied to the corresponding switch side IC terminals 22a to 22f via the connecting members 18.

When the connector 55a of the cable 55 is connected to the connector unit 12 of the switch device 10, the connector terminal 12a is connected to the signal line in the cable 55, the connector terminal 12b is connected to the power line that leads to the power supply 52 in the cable 55, and the connector terminal 12c is connected to the power line that leads to ground 53 in the cable 55. Accordingly, the connector terminals 12b and 12c supply the IC 20 with operational power.

The IC 20 recognizes the operation state of the lever in accordance with the voltage from each of the switches 19 (each of the switch side IC terminals 22a to 22f) and generates an information signal (digital signal) indicating the operation state of the lever. The IC 20 outputs the information signal from the vehicle side IC terminal 21a. Accordingly, the information signal generated by the IC 20 is provided to the BCM 50 via the vehicle side IC terminal 21a and the cable 55.

The present embodiment has the advantages described below.

(1) The switch side IC terminals 22a to 22f are arranged on the first long side surface 20a of the package 23 for the IC 20. The vehicle side IC terminals 21a to 21c are arranged on the second long side surface 20b, which differs from the first long side surface 20a. Accordingly, the switch side IC terminals 22a to 22f are not arranged adjacent to the vehicle side IC terminals 21a to 21c. This eliminates the need for elements that protect the switch side IC terminals 22a to 22f from magnetic fields formed by the vehicle side IC terminals 21a to 21c.

Further, the second long side surface 20b is located on the opposite side of the first long side surface 20a. Thus, the switch side IC terminals 22a to 22f are spaced apart from the vehicle side IC terminals 21a to 21c by a large distance. This reduces the influence of magnetic fields.

Additionally, the switch side IC terminals 22a to 22f are arranged in correspondence with the fixed contacts 13a to 13f, and the vehicle side IC terminals 21a to 21c are arranged in correspondence with the connector terminals 12a to 12c. This allows for the distance to be decreased between the switch side IC terminals 22a to 22f and the corresponding fixed contacts 13a to 13f and between the vehicle side IC terminals 21a to 21c and the corresponding connector terminals 12a to 12c. Thus, the lengths of the connecting members 18 can be minimized. In some case, the connecting members 18 may be eliminated. Accordingly, the structure of the switch device 10 can be simplified.

(2) The distance between adjacent ones of the switch side IC terminals 22a to 22f and adjacent ones of the fixed contacts 13a to 13f is set to the fixed distance L1. Further, the switch side IC terminals 22a to 22f are respectively arranged at positions corresponding to the fixed contacts 13a to 13f. This allows for further reduction in the length of the connecting members 18, which electrically connect the switch side IC terminals 22a to 22f and the fixed contacts 13a to 13f. Thus, the structure of the switch device can be simplified.

(3) The fixed distance L1 is set to ensure that adjacent ones of the fixed contacts 13a to 13f and adjacent ones of the switch side IC terminals 22a to 22f are kept electrically unconnected. This prevents the fixed contacts 13a to 13f from being electrically connected with one another and the switch side IC terminals 22a to 22f from being electrically connected with one another.

Figures 4A, 4B:
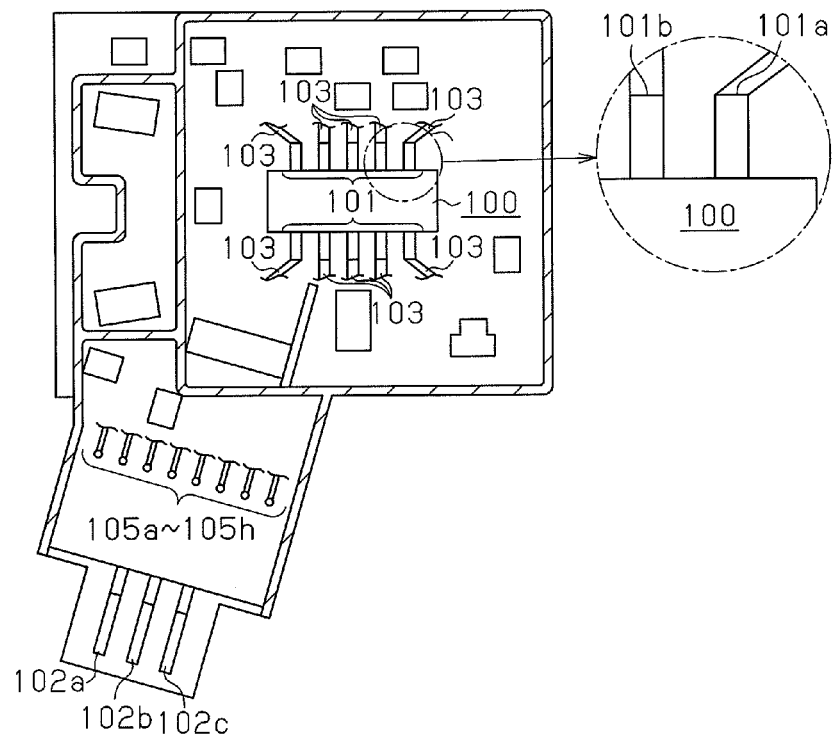
FIG. 4A is a cross-sectional view showing a conventional switch device.
FIG. 4B is an enlarged cross-sectional view showing connector terminals of the switch device of FIG. 4A.

(4) In the switch device, the structure of the fixed contacts 13a to 13f and the connector terminals 12a to 12c is the same in the multiplex type described in the Background Section (refer to FIG. 4) and in a non-multiplex type. Thus, the main part of the switch device excluding the IC 20 and the connecting members 18 has the same structure as that of the conventional switch device. Accordingly, the IC 20 and the connecting members 18 can be arranged in the conventional switch device.

It should be apparent to those skilled in the art that the present invention may be embodied in many other specific forms without departing from the spirit or scope of the invention. Particularly, it should be understood that the present invention may be embodied in the following forms.

The number of the fixed contacts 13a to 13f and the number of the switch side IC terminals 22a to 22f are not limited to six like in the above embodiment, and may be changed in accordance with the number of switches.

In the above embodiment, the connecting members 18 are arranged between the switch side IC terminals 22a to 22f and the fixed contacts 13a to 13f. However, a conductive pattern formed on the substrate 17b may be used to electrically connect the switch side IC terminals 22a to 22f and the fixed contacts 13a to 13f. Further, the distal ends of the switch side IC terminals 22a to 22f may directly contact the fixed contacts 13a to 13f to electrically connect the switch side IC terminals 22a to 22f and the fixed contacts 13a to 13f.

In the above embodiment, each switch 19 is a mechanical switch but may be a non-contact sensor such as a Hall IC.

In the above embodiment, the switch device is applied to a combination switch but may also be applied to other switches such as a mirror switch or a power window switch.

In the above embodiment, the order in which the vehicle side IC terminals 21a to 21c are laid out may be changed.

In the embodiment, the IC terminals 21a to 21c contact the connector terminals 12a to 12c. However, the IC terminals 21a to 21c may be formed integrally with the connector terminals 12a to 12c. In this case, the outer portions of the IC terminals 21a to 21c are pin-shaped.

In the above embodiment, adjacent ones of the fixed contacts 13a to 13f are spaced apart by the fixed distance L1 in the same manner as the switch side IC terminals 22a to 22f. However, adjacent ones of the fixed contacts 13a to 13f and adjacent ones of the switch side IC terminals 22a to 22f may be spaced apart by different distances. Further, the fixed contacts 13a to 13f may be arranged at different intervals, and adjacent switch side IC terminals 22a to 22f may be arranged at different intervals.

In the above embodiment, the vehicle side IC terminals 21a to 21c are arranged on the second long side surface 20b, and the switch side IC terminals 22a to 22f are arranged on the long side surface 20a. However, the vehicle side IC terminals 21a to 21c may be arranged on one of two short side surfaces (first side surface) of the package 23 for the IC 20, and the switch side IC terminals 22a to 22f may be arranged on the other one of the two short side surfaces (second side surface). This allows for the fixed contacts 13a to 13f to be spaced apart from the connector terminals 12a to 12c by a greater distance than the above embodiment. Like the above embodiment, in this case, the first side surface corresponds to the connector terminals 12a to 12c, and the second surface corresponds to the fixed contacts 13a to 13f. Further, the switch side IC terminals 22a to 22f and the vehicle side IC terminals 21a to 21c may be arranged on adjacent side surfaces of the package 23 for the IC 20. Moreover, the package 23 does not have to be rectangular as viewed from above. The package 23 only needs to be box that is polygonal as viewed from above and includes a first side surface and a second side surface, which differs from the first side surface.

In the above embodiment, the switch device 10 performs single direction communication with the BCM 50. However, bi-directional communication may be performed between the switch device 10 and the BCM 50. For example, the lever of the combination switch may be illuminated by a light emitting diode. In such a structure, when the IC 20 receives an activation request signal from the BCM 50 through the connector terminal 12a and the vehicle side IC terminal 21a, the IC 20 illuminates the light emitting diode. When the IC 20 receives a deactivation request in the same manner, the IC 20 deactivates the light emitting diode.

The present examples and embodiments are to be considered as illustrative and not restrictive, and the invention is not to be limited to the details given herein, but may be modified within the scope and equivalence of the appended claims.

The invention claimed is:

1. A detection signal output device comprising:
    a plurality of switches switchable between an activated state and a deactivated state, each of the switches being capable of outputting a signal in accordance with the activated state or the deactivated state;
    a plurality of fixed contacts respectively connected to the switches to receive signals output from the switches;
    a box-shaped integrated circuit package including:
        an integrated circuit that generates an information signal according to the signals output from the switches;
        a plurality of first IC terminals arranged at positions facing the fixed contacts, respectively, on a first side surface of the integrated circuit package and electrically connected to the fixed contacts; and
        a plurality of second IC terminals arranged on a second side surface of the integrated circuit package that is located on the opposite side of the first side surface, wherein the second IC terminals are configured to output the information signal generated by the integrated circuit;
    a plurality of spaced apart connector terminals arranged at positions facing the second IC terminals, respectively, and adapted to be connected by a cable to an external device;
    a square base including a first substrate; and an extension, coupled to the base, including a second substrate having an IC mounting surface on which the integrated circuit package is mounted, wherein the switches are arranged in the first substrate, and wherein the spaced apart connector terminals, the fixed contacts, the first IC terminals, and the second IC terminals are arranged on the IC mounting surface of the second substrate in a concentrated manner.

2. The detection signal output device according to claim 1, wherein the fixed contacts are spaced apart by a distance that is fixed, and the first IC terminals are spaced apart by a distance that is fixed and is the same as the fixed distance between the fixed contacts.

3. The detection signal output device according to claim 2, wherein the fixed distance is set as a distance that keeps the fixed contacts electrically unconnected to each other and the first IC terminals electrically unconnected to each other.

4. The detection signal output device according to claim 1, wherein the connector terminals include a power connector terminal.

* * * * *